United States Patent
Fujita

(10) Patent No.: US 7,256,712 B2
(45) Date of Patent: Aug. 14, 2007

(54) ENCODER HAVING A SIGNAL ELIMINATION UNIT

(75) Inventor: Hiromasa Fujita, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/290,237

(22) Filed: Nov. 30, 2005

(65) Prior Publication Data

US 2006/0114133 A1 Jun. 1, 2006

(30) Foreign Application Priority Data

Nov. 30, 2004 (JP) ............................. 2004-347343

(51) Int. Cl.
*H03M 1/17* (2006.01)
(52) U.S. Cl. ............................................. 341/1; 341/13
(58) Field of Classification Search .................. 341/13, 341/11, 6, 1
See application file for complete search history.

(56) References Cited

U.S. PATENT DOCUMENTS 4,360,730 A * 11/1982 Breslow ................ 250/231.13
7,145,128 B2 * 12/2006 Tanaka ................... 250/231.13
2004/0200958 A1 * 10/2004 Tanaka et al. ......... 250/231.13

FOREIGN PATENT DOCUMENTS

JP 06-026817 2/1994

* cited by examiner

*Primary Examiner*—Peguy JeanPierre
(74) *Attorney, Agent, or Firm*—Scully, Scott, Murphy & Presser, P.C.

(57) ABSTRACT

An encoder includes an encoder scale having a predetermined cyclic pattern, and at least one detection unit configured to detect a cyclic displacement according to movement of the encoder scale. The encoder further includes a signal elimination unit configured to subtract, from an output signal of the at least one detection unit, one of an entirety of a DC signal component, which is free from dependency on a relative displacement of the encoder scale, and a signal component that is proportional to the DC signal component.

17 Claims, 6 Drawing Sheets

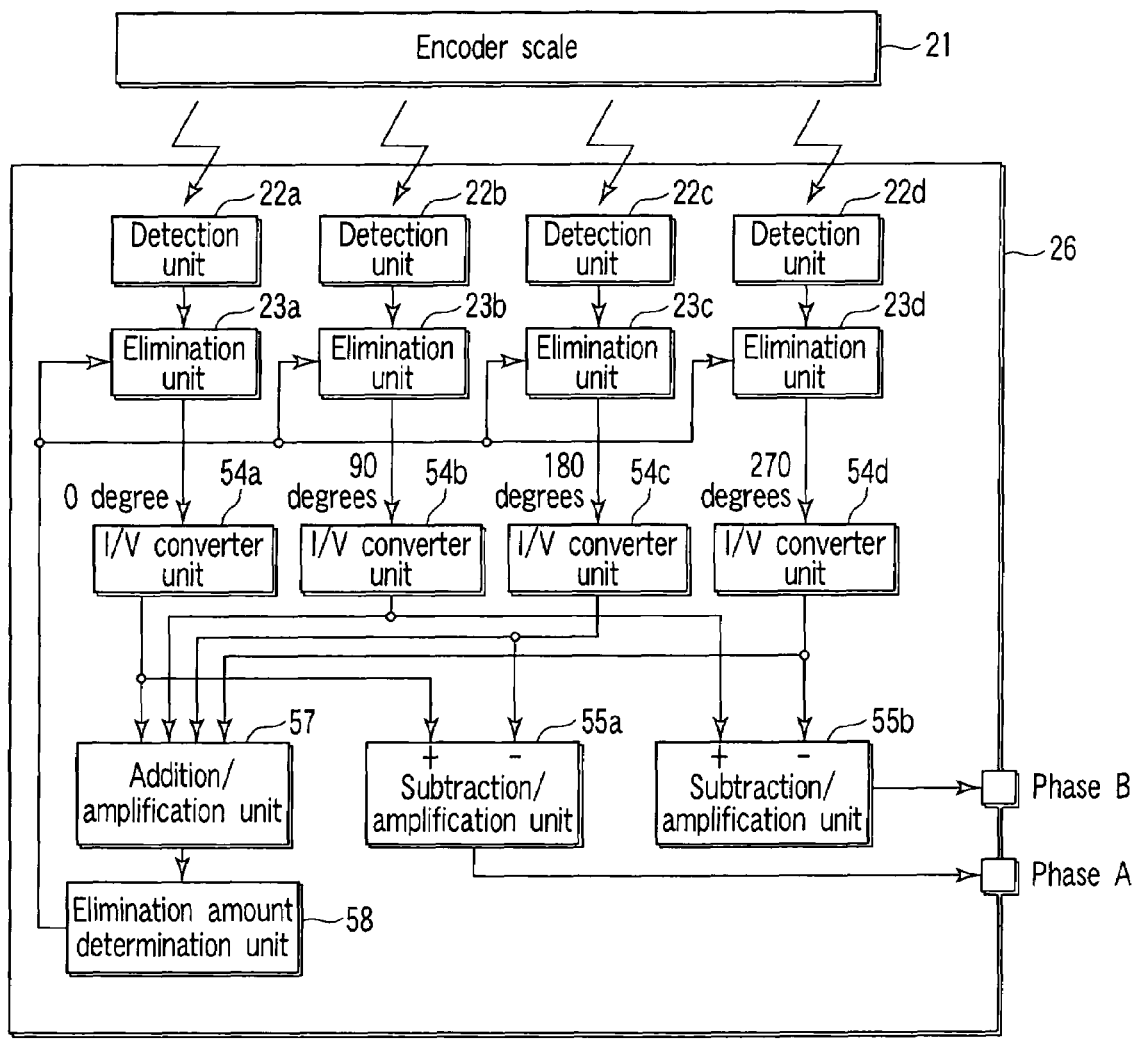
F I G. 5

ENCODER HAVING A SIGNAL ELIMINATION UNIT

CROSS-REFERENCE TO RELATED APPLICATIONS

This application is based upon and claims the benefit of priority from prior Japanese Patent Application No. 2004-347343, filed Nov. 30, 2004, the entire contents of which are incorporated herein by reference.

BACKGROUND OF THE INVENTION

1. Field of the Invention

The present invention relates to an encoder.

2. Description of the Related Art

An encoder is an apparatus that generates a plurality of cyclic signals with different phases. The cyclic signals are supplied to a processing circuit for counting cycles, thereby allowing a direction of progress, a position, a displacement, a velocity of displacement, etc., to be measured. A conventional encoder is disclosed, for instance, in Jpn. Pat. Appln. KOKAI Publication No. 6-26817.

BRIEF SUMMARY OF THE INVENTION

According to an aspect of the present invention, there is provided an encoder comprising:

an encoder scale having a predetermined cyclic pattern;

at least one detection unit configured to detect a cyclic displacement according to movement of the encoder scale; and a signal elimination unit configured to subtract, from an output signal of the at least one detection unit, one of an entirety of a DC signal component, which is free from dependency on a relative displacement of the encoder scale, and a signal component that is proportional to the DC signal component.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a view that shows the structure of an encoder according to a third embodiment of the invention;

DETAILED DESCRIPTION OF THE INVENTION

Embodiments of the present invention will now be described with reference to the accompanying drawings.

FIRST EMBODIMENT

Figure 1:
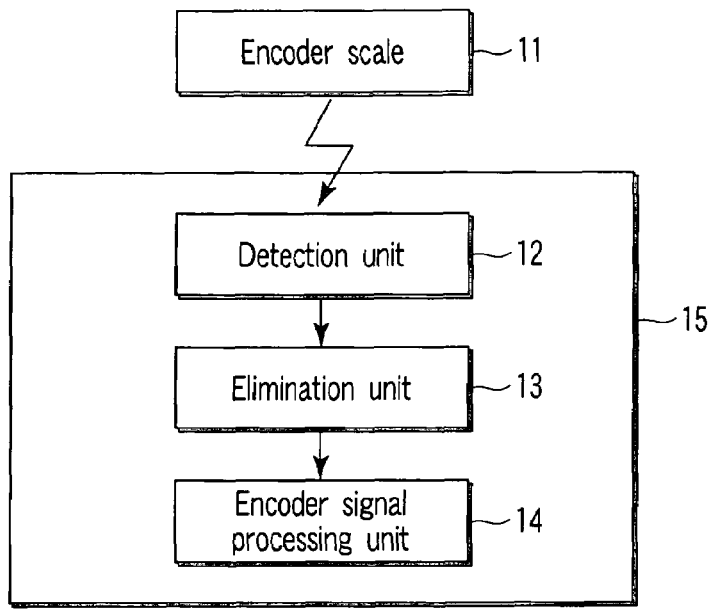
FIG. 1 is a view that shows the structure of an encoder according to a first embodiment of the present invention.

FIG. 1 shows the structure of an encoder according to a first embodiment of the present invention. The structure of the encoder according to the first embodiment is described with reference to FIG. 1.

The encoder according to this embodiment comprises an encoder scale 11 having a pattern of a predetermined cycle, and an encoder head 15. The encoder scale 11 and encoder head 15 are configured to be displaceable relative to each other.

The encoder head 15 comprises a detection unit 12, an elimination unit 13 and an encoder signal processing unit 14, which are configured to function in the way described below.

The detection unit 12 detects a relative displacement between the encoder scale 11 and encoder head 15 by an optical, magnetic or electrostatic method, and outputs relative-displacement signals corresponding to such relative displacement. Each of the relative-displacement signals that are output from the detection unit 12 includes a DC signal component that does not vary depending on a relative displacement between the scale 11 and encoder head 15, and an AC signal component that varies depending on a relative displacement between the scale 11 and encoder head 15. The elimination unit 13 eliminates the entire DC signal component, or signal component proportional to the DC signal component, from the relative-displacement signals that are output from the detection unit 12. The encoder signal processing unit 14 produces a plurality of cyclic signals with different phases, that is, a plurality of encoder signals, on the basis of signals from which the DC signal component has been eliminated in the elimination unit 13.

According to the above-described structure, even in the case where the DC signal component is greater than the AC signal component in the relative-displacement signals that is output from the detection unit 12 in accordance with a relative displacement between the encoder scale 11 and encoder head 15, the DC signal component is eliminated or relatively reduced by the elimination unit 13. Thus, when the signal, which has been processed by the elimination unit 13, is input to the encoder signal processing unit 14, the ratio of the AC signal component in the signal is greater than the ratio of DC signal component. This enables processing in a range within which proper arithmetic operations, such as amplification, can be performed in the encoder signal processing unit 14. This structure is more effective when the power supply voltage is low, since the range in the processing circuit of the encoder signal processing unit 14 becomes narrower.

Figure 2:
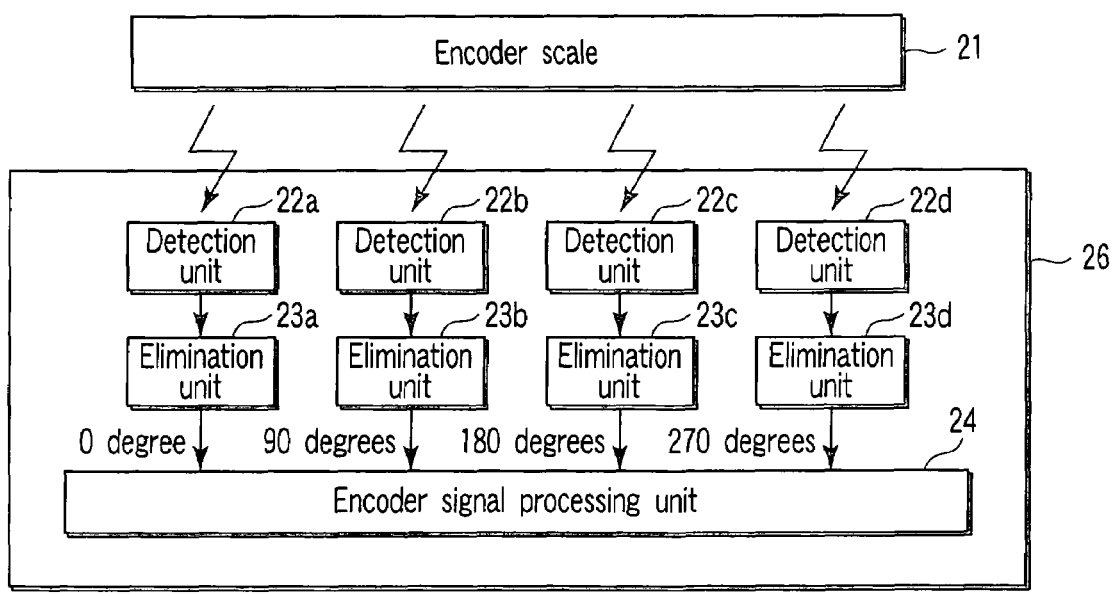
FIG. 2 is a view that shows the structure of an encoder, which partly embodies the structure of the encoder shown in FIG. 1.

FIG. 2 is a view that shows the structure of an encoder, which partly embodies the structure of the encoder shown in FIG. 1. In the encoder shown in FIG. 2, like the encoder shown in FIG. 1, an encoder scale 21 and an encoder head 26 are configured to be displaceable relative to each other.

In addition, there are provided four detection units 22a, 22b, 22c and 22d, which are configured to output signals with phases that differ by about a ¼ phase from one another, in accordance with the relative displacement of the encoder scale 21 and encoder head 26.

Further, elimination units 23a, 23b, 23c and 23d are provided. The elimination unit 23a, 23b, 23c, 23d is configured to eliminate the entirety of a DC signal component, or a signal component proportional to the DC signal component, from a signal that includes a AC signal component and a DC signal component and is detected by the associated detection unit 22a, 22b, 22c, 22d. The elimination unit 23a, 23b, 23c, 23d is connected between the detection unit 22a, 22b, 22c, 22d and an encoder signal processing unit 24. The encoder signal processing unit 24 generates two-phase encoder signals with a phase difference of about ¼ phase.

As has been described above, according to the first embodiment, in the encoder that outputs encoder signals using the four-phase detections units with a phase difference of about ¼ phase from one another, the encoder signal processing unit 24 can execute signal processing in the proper range even in the case where the DC signal component in each output signal from the detection unit 22a, 22b, 22c, 22d is greater than the AC signal component in the output signal. This is because the entirety of a DC signal component, or a signal component proportional to the DC signal component, is eliminated by the signal elimination unit.

In a conventional encoder, in the case where the DC signal component is greater than the AC signal component, the range for signal processing is completely occupied by the DC signal component alone in the signal processing. On the other hand, in the encoder according to the present embodiment, the entirety of the DC signal component, or a signal component proportional to the DC signal component, is eliminated by the elimination unit 23a, 23b, 23c, 23d. Thereby, encoder signals can be generated by the signal processing in the proper range in the encoder signal processing unit.

Needless to say, the advantageous effect of the encoder of this embodiment can be obtained, regardless of the number of detection units provided in the encoder.

In the encoder according to this embodiment, at least in the structure shown in FIG. 1, it is preferable to mount the detection unit 12 and elimination unit 13 on the same board or on the same semiconductor substrate. In the structure shown in FIG. 2, it is preferable to mount the detection units 22a, 22b, 22c and 22d and elimination units 23a, 23b, 23c and 23d on the same board or on the same semiconductor substrate. For example, when the detection unit and elimination unit are mounted on the same semiconductor substrate, a small-sized encoder can be realized. Also, in the case of adopting the structure shown in FIG. 2, non-uniformity in elimination amount between the elimination units 23a, 23b, 23c and 23d can be reduced, and the encoder signals can be stabilized, and an encoder with good performance can be realized.

SECOND EMBODIMENT

Next, a concrete structure of the encoder according to the first embodiment is described as a second embodiment of the invention.

Figure 3:
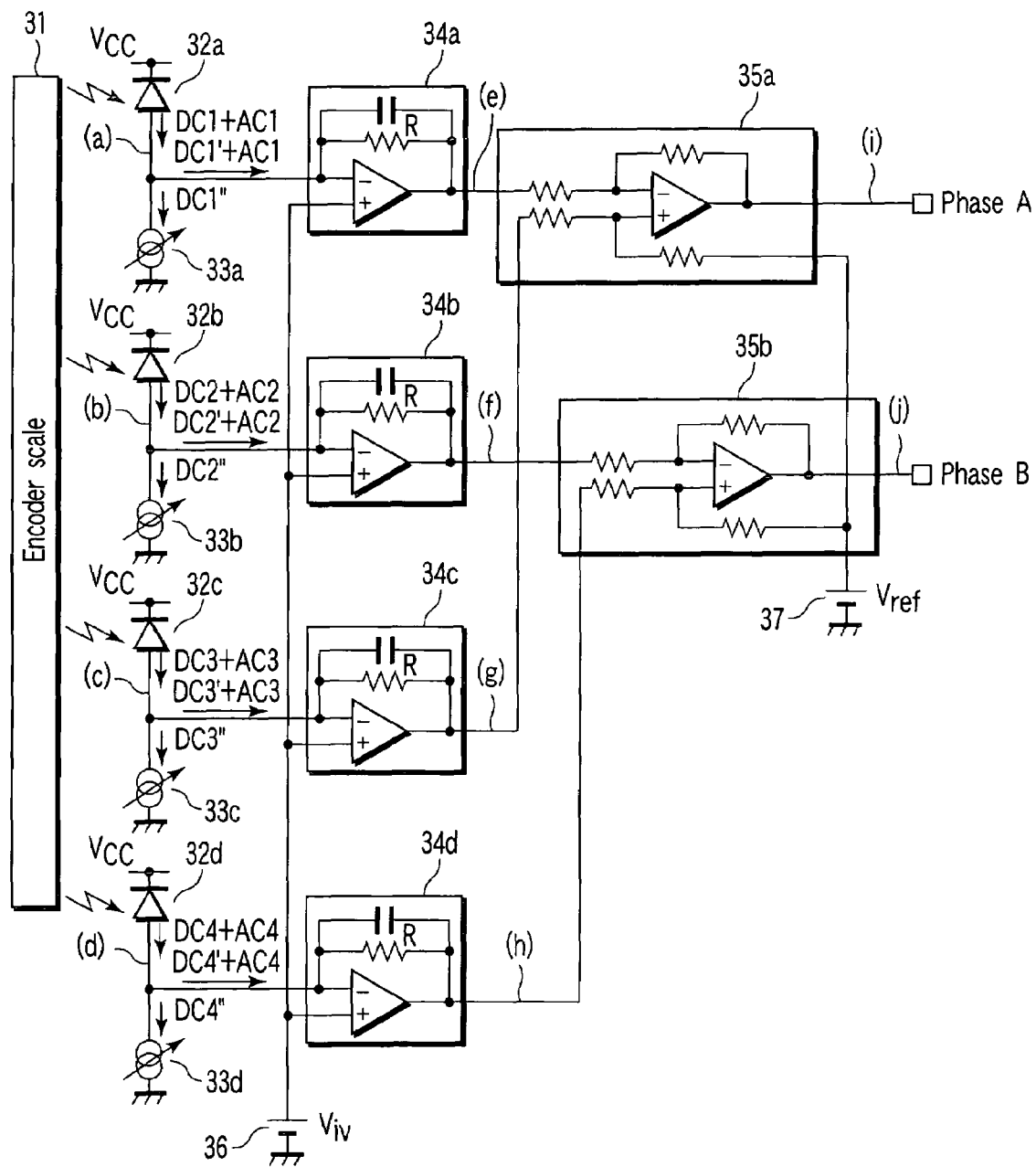
FIG. 3 is a view that shows the structure of an encoder according to a second embodiment of the invention.

An encoder according to the second embodiment is an example of an optical encoder. As is shown in FIG. 3, the encoder comprises an encoder scale 31, a light source (not shown) and detection units 32a, 32b, 32c and 32d. The encoder scale 31 has a cyclic pattern (not shown). The light source (not shown) comprises a coherent light source that illuminates the encoder scale 31. This type of optical encoder is disclosed in Jpn. Pat. Appln. KOKAI Publication No. 6-26817, for instance. Thus, a detailed description of the optical encoder is omitted here. The detection units 32a, 32b, 32c and 32d are composed of, e.g., photodiodes for detecting an optical image that is formed via the encoder scale 31. The detection units 32a, 32b, 32c and 32d are arranged such that AC signal components that are detected by the detection units 32a, 32b, 32c and 32d have a phase shift of about 90° relative to each other. The light source (not shown) and the detection units 32a, 32b, 32c and 32d are configured to be displaceable relative to the encoder scale 31.

The detection units 32a, 32b, 32c and 32d are connected, respectively, to elimination units 33a, 33b, 33c and 33d, which are composed of, e.g., variable current supplies, and current/voltage converter units 34a, 34b, 34c and 34d. A power supply 36 that generates a reference voltage $V_{iv}$ is connected to the current/voltage converter units 34a, 34b, 34c and 34d.

The current/voltage converter units 34a and 34c are connected to a subtraction/amplification unit 35a. The current/voltage converter units 34b and 34d are connected to a subtraction/amplification unit 35b. A power supply 37, which applies a reference voltage $V_{ref}$ for an encoder phase-A signal and an encoder phase-B signal, is connected to the subtraction/amplification units 35a and 35b.

The subtraction/amplification unit 35a is configured to output the encoder phase-A signal, and the subtraction/amplification unit 35b is configured to output the encoder phase-B signal. Thus, the current/voltage converter units 34a, 34b, 34c and 34d and the subtraction/amplification units 35a and 35b constitute an encoder signal processing unit.

Figure 4:
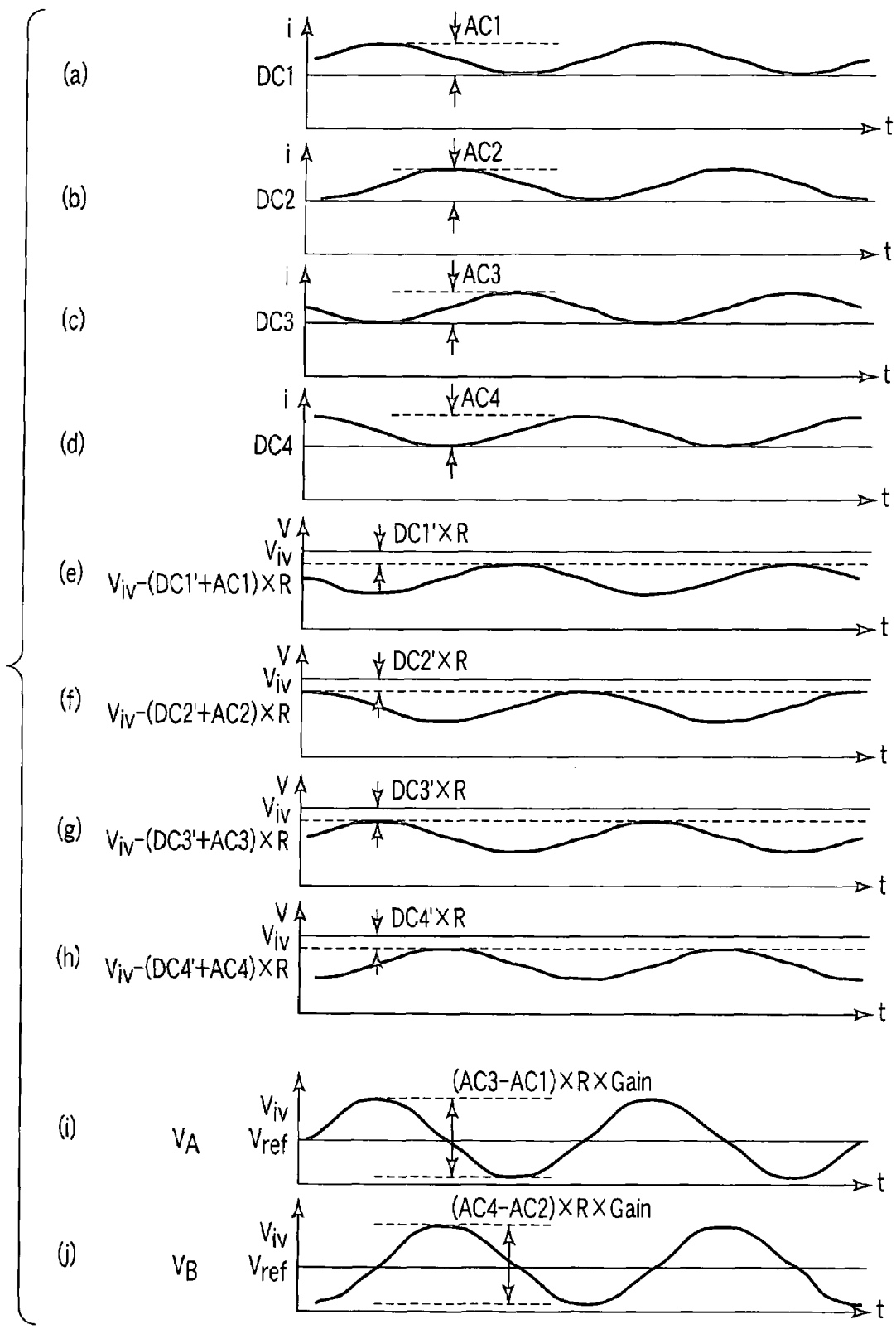
FIG. 4 is a view that shows waveforms of signals in respective structural elements of the encoder according to the second embodiment.

The detection units 32a, 32b, 32c and 32d detect an optical image that varies in accordance with a relative displacement between the encoder scale 31 and the encoder head (in the encoder with the structure shown in FIG. 3, the encoder head is a section composed of structural elements other than the encoder scale 31). Thereby, the detection units 32a, 32b, 32c and 32d output AC signal components AC1, AC2, AC3 and AC4, which vary in accordance with the above-mentioned relative displacement, and DC signal components DC1, DC2, DC3 and DC4, which are substantially invariable in accordance with the above-mentioned relative displacement. Output signals from the detection units 32a, 32b, 32c and 32d have waveforms of signals (a), (b), (c) and (d), as shown in FIG. 4. As is understood from FIG. 4, the output signals from the detection units 32a, 32b, 32c and 32d are produced such that the waveforms of the AC signal components are superimposed on the waveforms of the DC signal components.

The elimination unit 33a eliminates an entire or partial DC signal component DC1" of the DC signal component DC1. The elimination unit 33b eliminates an entire or partial DC signal component DC2" of the DC signal component DC2. The elimination unit 33c eliminates an entire or partial DC signal component DC3" of the DC signal component DC3. The elimination unit 33d eliminates an entire or partial DC signal component DC4" of the DC signal component DC4.

Accordingly, as shown in FIG. 3, the signal component, which is delivered from the detection unit 32a to the current/voltage converter unit 34a, is expressed by $$DC1'+AC1=DC1-DC1''+AC1.$$

As shown in FIG. 3, the signal component, which is delivered from the detection unit 32b to the current/voltage converter unit 34b, is expressed by $$DC2'+AC2=DC2-DC2''+AC2.$$

As shown in FIG. 3, the signal component, which is delivered from the detection unit 32c to the current/voltage converter unit 34c, is expressed by $$DC3'+AC3=DC3-DC3''+AC3.$$

As shown in FIG. 3, the signal component, which is delivered from the detection unit 32d to the current/voltage converter unit 34d, is expressed by $$DC4'+AC4=DC4-DC4''+AC4.$$

The current/voltage converter units 34a, 34b, 34c and 34d convert the supplied signal components DC1'+AC1, DC2'+AC2, DC3'+AC3, and DC4'+AC4 to voltage values that are decreased by values to be described below. That is, these values are values that are decreased from the reference voltage $V_{iv}$ toward the GND potential by products between the signal components DC1'+AC1, DC2'+AC2, DC3'+AC3, and DC4'+AC4 and the values of feedback resistances R of the current/voltage converter units 34a, 34b, 34c and 34d. Output signals of the current/voltage converter units 34a, 34b, 34c and 34d have waveforms of signals (e), (f), (g) and (h), as shown in FIG. 4. As is understood from FIG. 4, these output signals are produced such that the waveforms of the DC signal components are superimposed on the waveforms of the AC signal components.

The subtraction/amplification unit 35a receives the outputs from the current/voltage converter units 34a and 34c and produces an output that is expressed by $$((DC3'+AC3)-(DC1'+AC1))\times\text{resistance value } R\times\text{gain}+V_{ref}.$$

The subtraction/amplification unit 35b receives the outputs from the current/voltage converter units 34b and 34d and produces an output that is expressed by $$((DC4'+AC4)-(DC2'+AC2))\times\text{resistance value } R\times\text{gain}+V_{ref}.$$

The elimination amounts DC1", DC2", DC3" and DC4", which are eliminated by the elimination units 33a, 33b, 33c and 33d are adjusted so as to obtain DC1'=DC2'=DC3'=DC4' that are DC signal components after the elimination. Thereby, encoder signals, (AC3−AC1)×R×gain+$V_{ref}$ and (AC4−AC2)×R×gain+$V_{ref}$, which are free from an offset voltage that deviates from the voltage $V_{ref}$, can be obtained as the encoder signals that are to be output from the subtraction/amplification units 35a and 35b. The output signals from the subtraction/amplification units 35a and 35b have waveforms of signals (i) and (j) shown in FIG. 4. As is understood from FIG. 4, the waveforms of the output signals from the subtraction/amplification units 35a and 35b are substantially sinewave, with the horizontal axis set at the aforementioned reference voltage $V_{ref}$. These signals (i) and (j) are output as a phase-A encoder signal $V_A$ and a phase-B encoder signal $V_B$.

As has been described above, according to the second embodiment of the present invention, even in the case where the ratio of the DC signal component is greater than the ratio of the AC signal component, the output from the detection unit is processed so that the ratio of the AC signal component may become greater than the ratio of the DC signal component after the processing, and this processed signal is input to the current/voltage converter unit 34a, 34b, 34c, 34d. Thus, even if the resistance value of the feedback resistor R of the current/voltage converter unit 34a, 34b, 34c, 34d is set at a high value, it does not exceed the voltage range. Hence, the AC signal component, which is detected by the detection unit 32a, 32b, 32c, 32d, can be subjected to the current/voltage conversion in the current/voltage converter unit 34a, 34b, 34c, 34d in the state in which a distortion is small. Further, even if the gain in the subtraction/amplification unit 35a, 35b is not increased, an encoder signal with a good voltage level (capable of multiplication) can be output.

As has been described above, the detection unit comprises the four groups of detection elements (photodiodes), which have a phase difference of ¼ phase from each other. Thereby, the phase-A signal and phase-B signal, whose phases are shifted by 90°, can be output. At this time, a signal component, which is proportional to a sum of signals of the two detection element groups with opposite phases, has a value proportional to the DC signal component. Thus, the signal elimination unit can eliminate an amount proportional to the DC signal component, and the signal process can be executed within the range to generate encoder signals. Moreover, by using the sum of the signals from the two detection element groups with different phases, it becomes possible to execute feedback to the signal elimination unit and to perform an automatic process.

In brief, in the encoder of this embodiment, even in the case where there is such a DC signal component as to exceed the signal processing range, as mentioned above, the entirety of the DC signal component or a component proportional to the DC signal component is eliminated. Thereby, the encoder signals can be generated from the above-described current/voltage-converted signals. Thus, resistance to noise or distortion of encoder signals can be provided, and occurrence of offset voltage due to a slight difference between DC signal components can effectively be prevented. In the case where the power supply voltage is low, it is difficult to secure the range in the current/voltage converter unit. Therefore, the advantageous effect of the encoder of this embodiment becomes more important.

Furthermore, in the encoder of the present embodiment, in the case where DC signal components of the signal components, which are detected by the plural detection units, are different, signal components that are proportional to the DC signal components are eliminated so that DC signal components after the elimination may have the same value. Thereby, when signals of opposite phases are subjected to a subsequent signal process, i.e., a subtraction/amplification process, encoder signals can be generated by executing the signal processing within the range, and no offset voltage occurs. In short, encoder signals that are free from offset voltage can be output.

In the case where photodiodes, whose sensitivity varies due to a reverse bias voltage applied thereto, are used as the detection units 32a, 32b, 32c and 32d, it is necessary to secure the reverse bias voltage for enhancing the sensitivity of the photodiodes and the conversion range of the current/voltage conversion units 34a, 34b, 34c and 34d. In this case, therefore, the structure of the encoder according to this embodiment, wherein the elimination units 33a, 33b, 33c and 33d are employed, is indispensable.

In the encoder according to the present embodiment, it is preferable to mount the detection units 32a, 32b, 32c and 32d, elimination units 33a, 33b, 33c and 33d, current/voltage converter units 34a, 34b, 34c and 34d and subtraction/amplification units 35a and 35b on the same board or on the same semiconductor substrate. With this structure, a small-sized encoder can be fabricated. In addition, with the mounting of these elements on the same semiconductor substrate, the non-uniformity in elimination amount of the elimination units 33a, 33b, 33c and 33d can be reduced and stabilized, and an encoder with good performance can be realized.

In the present embodiment, for the purpose of description, the four-phase optical encoder, for example, has been described. Needless to say, the structure, operation and advantageous effect of the encoder of this embodiment are effective for encoders with different numbers of phases and for encoders of various types other than the optical type.

THIRD EMBODIMENT

Next, an encoder according to a third embodiment of the present invention is described. The encoder of this embodiment is described with reference to the accompanying drawings.

FIG. 5 is a view that shows the structure of the encoder according to this embodiment. Referring to FIG. 5, the structure of the encoder of this embodiment is described. Depiction and description of the structural elements that are common to those of the encoder of the first embodiment are partly omitted here.

To begin with, the structural differences between the encoder of the present embodiment and the encoder of the first embodiment are described.

The encoder of this embodiment includes current/voltage (I/V) converter units 54a, 54b, 54c and 54d, an addition/amplification unit 57, and an elimination amount determination unit 58. The current/voltage (I/V) converter units 54a, 54b, 54c and 54d are configured to convert the outputs from the elimination units 23a, 23b, 23c and 23d to voltages. The addition/amplification unit 57 is configured to add all the outputs from the current/voltage converter units 54a, 54b, 54c and 54d and to amplify the added value to produce a proper value. The elimination amount determination unit 58 is configured to automatically determine elimination amounts of the DC signal components in the elimination units 23a, 23b, 23c and 23d on the basis of the output from the addition/amplification unit 57. In addition, the elimination amount determination unit 58 is configured to execute feedback to the elimination units 23a, 23b, 23c and 23d.

Specifically, when the output signals from the detection units 22a, 22b, 22c and 22d are great, the output of the addition/amplification unit 57 is also great. Thus, the elimination amount determination unit 58 causes the elimination units 23a, 23b, 23c and 23d to increase the elimination amounts of the DC signal components.

On the other hand, when the output signals from the detection units 22a, 22b, 22c and 22d are small, the output of the addition/amplification unit 57 is also small. Thus, the elimination amount determination unit 58 causes the elimination units 23a, 23b, 23c and 23d to decrease the elimination amounts of the DC signal components or to reduce the elimination amounts of the DC signal components to zero.

As has been described above, according to the third embodiment of the invention, the elimination amounts of DC components can automatically be controlled in proportion to the amount of DC signal components that are produced by the detection units 22a, 22b, 22c and 22d. As a result, even if there occurs a difference in DC signal components due to adjustment of the encoder scale 21 and the encoder head 26, or a variation in DC signal components due to a difference or degradation in brightness of an optical image, or degradation in the state of the encoder scale 21, it is possible to keep substantially constant the DC signal components that are supplied to the current/voltage converter units 54a, 54b, 54c and 54d. This is because the DC signal component elimination amounts in the elimination units 23a, 23b, 23c and 23d can be varied. Thereby, in the circuit for processing the signal components from which DC signal components are eliminated, encoder signals can be generated by the signal processing in the proper range.

In the encoder according to this embodiment, the elimination amounts in the elimination units 23a, 23b, 23c and 23d are varied in accordance with the values of the DC signal components of the detection units 22a, 22b, 22c and 22d. Thereby, even in the case where there is a variation in the condition of attachment between the encoder and encoder head or a variation in reflectance of the encoder scale 21, the DC signal component after the elimination can be made constant. Therefore, the range at the time of signal processing is always stable, and only the AC signal components that are necessary for encoder signals can be varied within the range.

The four groups of detection elements with different phases, such as the detection units 22a, 22b, 22c and 22d, are used as the detection units. The sum of detection amounts of the detection element groups is a total detection amount of the detection element groups. By eliminating signal components proportional to the total detection amount, the elimination units 23a, 23b, 23c and 23d can eliminate signals of the amount proportional to the DC signal components. Thus, in the circuit that processes the signals from which the DC signal components have been eliminated, the signals can be processed without exceeding the range. By using the sum of the four detection element groups with different phases, it becomes possible to execute feedback to the elimination units 23a, 23b, 23c and 23d and to perform an automatic process.

Besides, in the encoder according to this embodiment, it is preferable to mount the detection units 22a, 22b, 22c and 22d, elimination units 23a, 23b, 23c and 23d, current/voltage converter units 54a, 54b, 54c and 54d, subtraction/amplification units 55a and 55b and addition/amplification unit 57 on the same board or the same semiconductor substrate. With this structure, a small-sized encoder can be fabricated. In addition, with the mounting of these elements on the same semiconductor substrate, the non-uniformity in elimination amount of the elimination units 23a, 23b, 23c and 23d can be reduced and the encoder signals can be stabilized. Thus, an encoder with good performance can be realized.

The encoder according to this embodiment can be modified without changing the basic structure thereof. Two examples are shown below.

In the present embodiment, as described above, the addition/amplification unit 57 adds all the inputs for the four phases. Needless to say, alternatively, addition/amplification units may separately be provided for the signals with a phase difference of 180°, and feedback may be executed to the elimination units associated with the phases of the added signals. In addition, an addition/amplification unit may be provided for a pair of signals with a phase difference of 180°, and feedback may be executed to the elimination units associated with all phases.

In the present embodiment, for the purpose of description, the four-phase optical encoder, for example, has been described. Needless to say, the structure, operation and advantageous effect of the encoder of this embodiment are effective for encoders with different numbers of phases.

FOURTH EMBODIMENT

Next, an encoder according to a fourth embodiment of the present invention is described. This embodiment relates to an optical encoder, which is a specific example of the third embodiment. The encoder of this embodiment will now be described with reference to the accompanying drawings.

Figure 6:
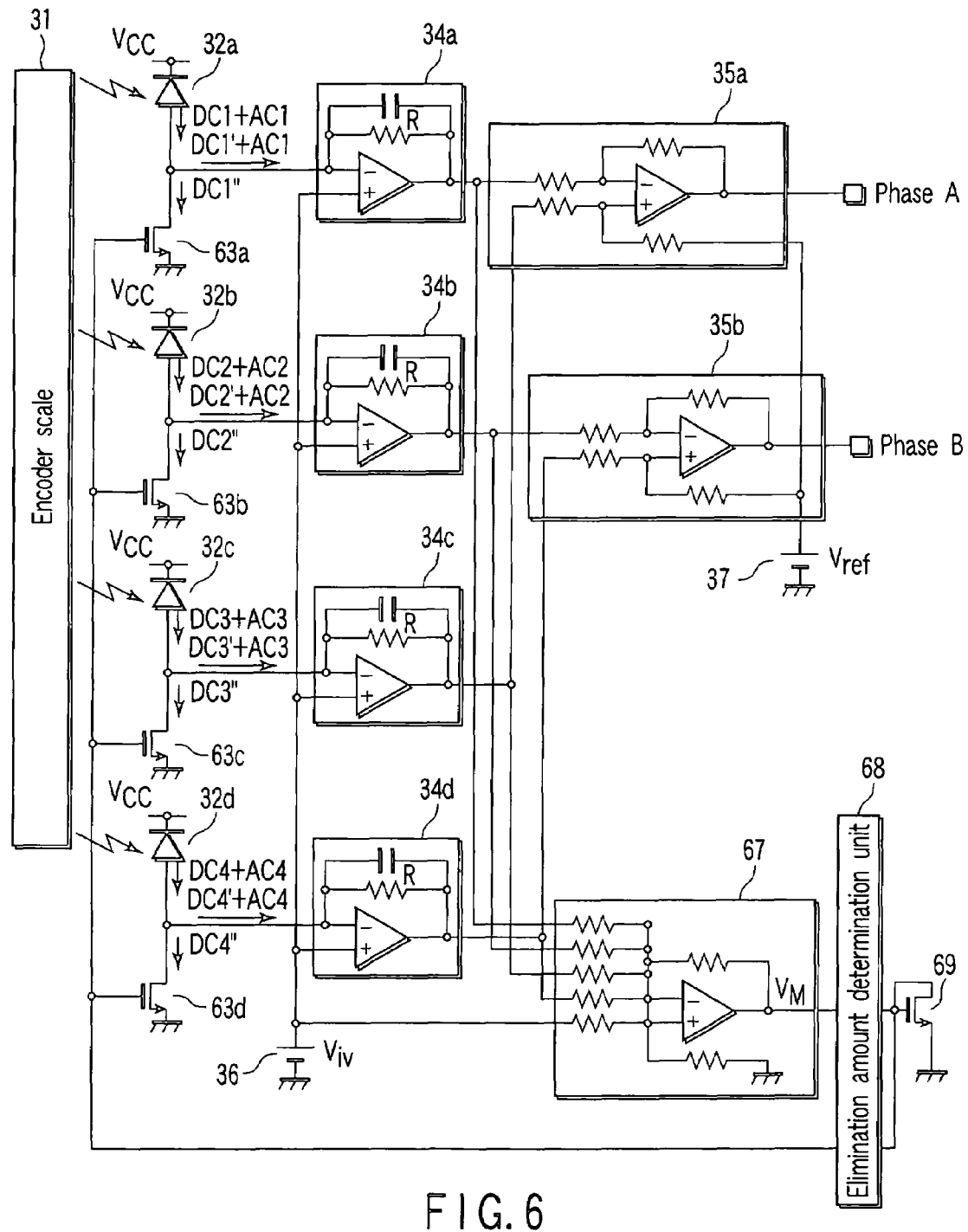
FIG. 6 is a view that shows the structure of an encoder according to a fourth embodiment of the invention.

FIG. 6 is a view that shows the structure of the optical encoder according to this embodiment. Referring to FIG. 6, the structure of the optical encoder of this embodiment is described. Depiction and description of the structural elements that are common to those of the encoder of the second embodiment are partly omitted here.

To begin with, the structural differences between the encoder of the present invention and the encoder of the second embodiment are described.

N-type MOS transistors 63*a*, 63*b*, 63*c* and 63*d* are used as the elimination units. The drains of the N-type MOS transistors 63*a*, 63*b*, 63*c* and 63*d* are connected to the detection units 32*a*, 32*b*, 32*c* and 32*d* and current/voltage converter units 34*a*, 34*b*, 34*c* and 34*d*. All the sources of the N-type MOS transistors 63*a*, 63*b*, 63*c* and 63*d* are connected to ground potential. The gates of the N-type MOS transistors 63*a*, 63*b*, 63*c* and 63*d* are connected to the gate of an N-type MOS transistor 69 that constitutes a current mirror. Outputs from the current/voltage (I/V) converter units 34*a*, 34*b*, 34*c* and 34*d* are added and amplified by an addition/amplification unit 67, and an output $V_M$ from the addition/amplification unit 67 is input to an elimination amount determination unit 68.

An output from the elimination amount determination unit 68 is connected to the gate and drain of the N-type MOS transistor 69. The source of the N-type MOS transistor 69 is connected to ground potential.

The elimination amounts of DC signal components, which are determined by the elimination amount determination unit 68 are output to the N-type MOS transistor 69. The N-type MOS transistors 63*a*, 63*b*, 63*c* and 63*d*, which constitute the current mirror with the N-type MOS transistor 69 with a predetermined ratio, eliminate DC signal components from the signals of the detection units 32*a*, 32*b*, 32*c* and 32*d*.

Figure 7:
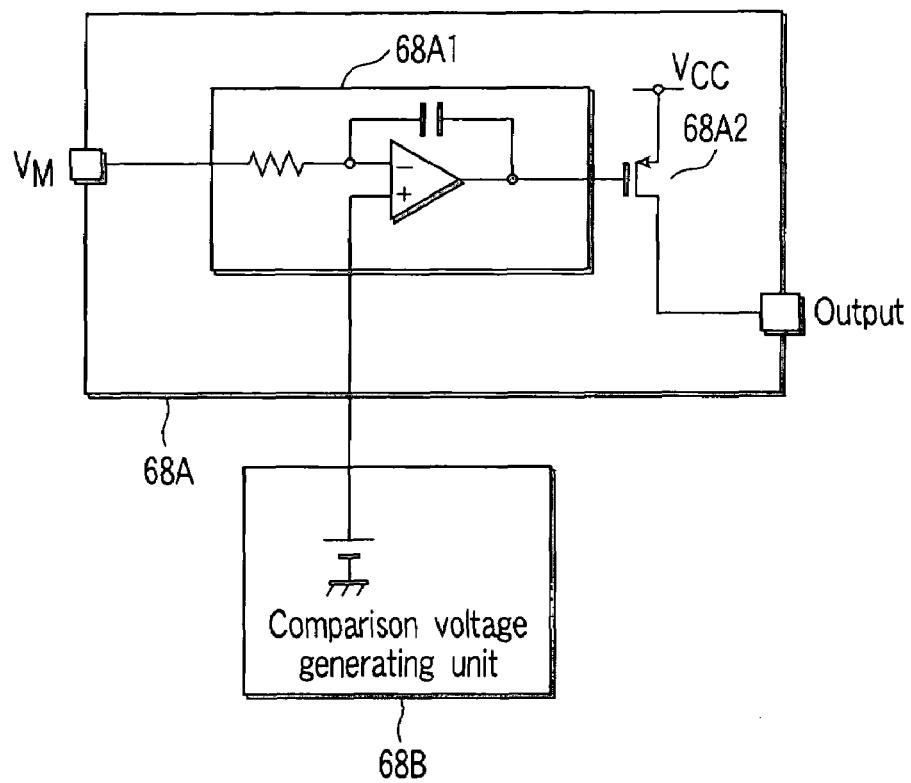
FIG. 7 is a view that shows an example of the structure of an elimination amount determination unit.
Figure 8:
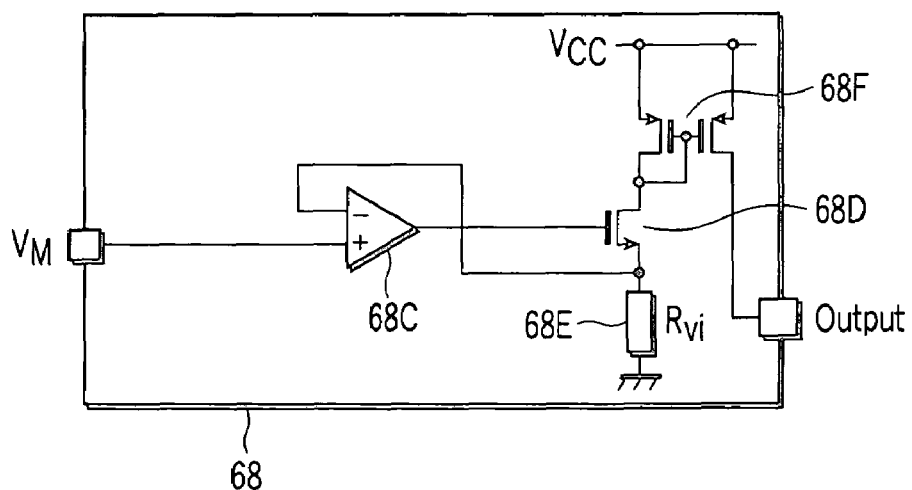
FIG. 8 is a view that shows another example of the structure of the elimination amount determination unit.

FIG. 7 and FIG. 8 show specific examples of the structure of the elimination amount determination unit 68.

An elimination amount determination unit 68A shown in FIG. 7 has a connection configuration, as will be described below, in order to prevent oscillation. An amplifier 68A1 has an inverting terminal that is connected to an input resistance and a feedback capacitance, and the input resistance of the amplifier 68A1 is connected to the output $V_M$ of the addition/amplification unit 67 shown in FIG. 6. A non-inverting terminal of the amplifier 68A1 is connected to a comparison voltage generating unit 68B that generates a voltage of a predetermined value. An output of the amplifier 68A1 is connected to a P-type MOS transistor 68A2. The source of the P-type MOS transistor 68A2 is connected to a power supply voltage, and the drain thereof is connected to the drain and gate of the N-type MOS transistor 69 shown in FIG. 6.

With this structure, the elimination amount determination unit 68A performs an operation for determining the output of the amplifier 68A1 so as to make the value of $V_M$ equal to the value of the voltage that is generated by the comparison voltage generating unit 68B, thereby determining the elimination amount, which is to be eliminated by the P-type MOS transistor 68A2, the N-type MOS transistor 69 and the elimination units 63*a*, 63*b*, 63*c* and 63*d* that constitute the current mirror.

The voltage that is generated by the comparison voltage generating unit 68B is determined in advance so that the encoder signal may fall within the range of each process unit.

An elimination amount determination unit 68 shown in FIG. 8 includes an amplifier 68C that has a non-inverting terminal connected to the output $V_M$ of the addition/amplification unit 67 shown in FIG. 6. An output of the amplifier 68C is connected to the gate of an N-type MOS transistor 68D. The source of the N-type MOS transistor 68D is connected to a resistor 68E that has a resistance value $R_{vi}$ between itself and ground GND, and to an inverting input terminal of the amplifier 68C.

For example, when an AC signal component is sufficiently less than a DC signal component in the signal that is detected by the detection unit 32*a*, 32*b*, 32*c*, 32*d*, it is indicated that the output $V_M$ of the addition/amplification unit 67 represents the DC signal component. Thus, in this case, the elimination amount of the DC signal component, which is determined by the elimination amount determination unit 68 and is to be eliminated by the elimination unit 63*a*, 63*b*, 63*c*, 63*d*, is proportional to the DC signal component.

The drain of the N-type MOS transistor 68D is connected to a mirror circuit 68F that mirrors the current to be supplied to the resistor 68E. The output of the elimination amount determination unit 68 is connected to the drain and gate of the N-type MOS transistor 69 shown in FIG. 6.

With this structure, the elimination amount of the elimination unit 63*a*, 63*b*, 63*c*, 63*d* is determined on the basis of the output $V_M$ of the addition/amplification unit 67 and the resistance value $R_{vi}$ of the resistor 68E, thereby executing a control to make the input value at the inverting terminal of the amplifier 68C equal to the input value to the non-inverting terminal of the amplifier 68C, which is connected to the addition/amplification unit 67.

As has been described above, according to the fourth embodiment of the invention, even in the case where the DC signal component is greater than the AC signal component in the signal that is detected by the detection unit 32*a*, 32*b*, 32*c*, 32*d*, the DC signal component is decreased or reduced to zero in the signal component that is supplied to the circuit for executing the subsequent signal processing. Thus, when the signal conversion is to be executed, the encoder signal can be converted within the range of the circuit that executes the signal conversion process. This advantageous effect is more effective when the power supply voltage of the circuit for executing the signal processing is low.

Since the elimination unit can be composed of the single N-type MOS transistor, the elimination unit can be provided at low cost. This structure of the elimination unit contributes to reduction in size of the encoder head.

It is preferable to mount the structural elements shown in FIG. 6, other than the encoder scale 31, on the same board or the same semiconductor substrate. If these structural elements are mounted on the same semiconductor substrate, the encoder head (i.e., the structural unit composed of the structural elements other than the encoder scale 31 in the case of the encoder shown in FIG. 6) that is able to output an encoder signal can be provided at low cost with a very small size. In addition, with the mounting of these elements on the same semiconductor substrate, the non-uniformity in elimination amount of the elimination units can be reduced and stabilized, and an encoder with good performance can be realized.

In the case where the structural elements other than the encoder scale 31 are mounted on the same semiconductor substrate and the DC signal components that are detected by the detection units 32a, 32b, 32c and 32d are substantially equal, more exact encoder signals can be generated by adopting the following structure. That is, since the subtraction/amplification units 35a and 35b that perform subtraction for signal components with a phase difference of 180° are provided, the elimination units 63a and 63c and the elimination units 63b and 63d may be configured to be combined in layout so that the elimination amounts may become equal. Thereby, more exact encoder signals can be generated.

The encoder according to this embodiment, too, can be modified without changing the basic structure thereof. In the present embodiment, for the purpose of description, the four-phase optical encoder, for example, has been described. Needless to say, the structure, operation and advantageous effect of the encoder of this embodiment are effective for encoders with different numbers of phases and for encoders of various types other than the optical type.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encoder comprising:
   an encoder scale having a predetermined cyclic pattern;
   at least one detection unit configured to detect a cyclic displacement according to movement of the encoder scale; and
   a signal elimination unit configured to perform an arithmetic operation for subtracting, from an output signal of the at least one detection unit, which includes an AC signal component depending on a relative displacement of the encoder scale and a DC signal component not depending on the relative displacement of the encoder, one of an entirety of the DC signal component and a signal component that is proportional to the DC signal component;
   wherein the at least one detection unit and the signal elimination unit are mounted on one of a single board and a single substrate.

2. The encoder according to claim 1, wherein the encoder is an optical-type encoder that includes a light source configured to emit a predetermined light beam, and an optical scale, which functions as the encoder scale, is provided with a cyclic optical pattern crossing the light beam, and is disposed to be displaceable relative to the light source,
   the detection unit is at least one light receiving element that is configured to detect a displacement of an optical image, which is formed on a light receiving surface thereof by the light beam which is emitted from the light source and passes through the optical scale, the detection unit outputting a current signal component as the output signal.

3. An encoder comprising:
   an encoder scale having a predetermined cyclic pattern;
   at least one detection unit configured to detect a cyclic displacement according to movement of the encoder scale; and
   a signal elimination unit configured to subtract, from an output signal of the at least one detection unit, one of an entirety of a DC signal component, which is free from dependency on a relative displacement of the encoder scale, and a signal component that is proportional to the DC signal component;
   wherein the signal elimination unit eliminates a predetermined amount of a signal component from the output signal of the at least one detection unit such that DC signal components, which are left after signal components proportional to the DC signal components are subtracted from the output signals of the at least one detection unit, become equal.

4. The encoder according to claim 3, wherein the at least one detection unit and the signal elimination unit are mounted on one of the a board and a same semiconductor substrate.

5. An encoder comprising:
   an encoder scale having a predetermined cyclic pattern;
   at least one detection unit configured to detect a cyclic displacement according to movement of the encoder scale;
   a signal elimination unit configured to subtract, from an output signal of the at least one detection unit, one of an entirety of a DC signal component, which is free from dependency on a relative displacement of the encoder scale, and a signal component that is proportional to the DC signal component;
   a DC signal detection unit configured to detect a DC signal component that is output from the at least one detection unit; and
   an elimination amount determination unit configured to determine an elimination amount of the DC signal component, which is to be eliminated in accordance with a detection value of the DC signal detection unit,
   wherein the signal elimination unit varies the DC signal component to be eliminated, on the basis of an output of the elimination amount determination unit.

6. The encoder according to claim 5, wherein the at least one detection unit and the signal elimination unit are mounted on one of the a board and a same semiconductor substrate.

7. An encoder comprising:
   an encoder scale having a predetermined cyclic pattern;
   at least one detection unit configured to detect a cyclic displacement according to movement of the encoder scale; and
   a signal elimination unit configured to subtract, from an output signal of the at least one detection unit, one of an entirety of a DC signal component, which is free from dependency on a relative displacement of the encoder scale, and a signal component that is proportional to the DC signal component;
   wherein the detection unit is composed of four groups of detection elements that have phases of output signals with a phase difference of ¼ from one another, and
   the signal elimination unit eliminates, from output signals from two of the four groups of detection elements, which have opposite phases, a signal component proportional to an added value of output signals from the associated two of the four groups of detection elements.

8. The encoder according to claim 7, wherein the at least one detection unit and the signal elimination unit are mounted on one of the a board and a same semiconductor substrate.

9. An encoder comprising:
   an encoder scale having a predetermined cyclic pattern;

at least one detection unit configured to detect a cyclic displacement according to movement of the encoder scale; and a signal elimination unit configured to subtract, from an output signal of the at least one detection unit, one of an entirety of a DC signal component, which is free from dependency on a relative displacement of the encoder scale, and a signal component that is proportional to the DC signal component;

wherein the detection unit is composed of four groups of detection elements which have phases of output signals with a phase difference of ¼ from one another, and the signal elimination unit eliminates, from output signals from the four groups of detection elements, a signal component proportional to an added value of the output signals from the four groups of detection elements.

10. The encoder according to claim 9, wherein the at least one detection unit and the signal elimination unit are mounted on one of the a board and a same semiconductor substrate.

11. An encoder comprising:
an encoder scale having a predetermined cyclic pattern;
at least one detection unit configured to detect a cyclic displacement according to movement of the encoder scale; and
a signal elimination unit configured to subtract, from an output signal of the at least one detection unit, one of an entirety of a DC signal component, which is free from dependency on a relative displacement of the encoder scale, and a signal component tat is proportional to the DC signal component;
wherein the encoder is an optical-type encoder that includes a light source configured to emit a predetermined light beam, and an optical scale, which functions as the encoder scale, is provided with a cyclic optical pattern crossing the light beam, and is disposed to be displaceable relative to the light source,
the detection unit is at least one light receiving element that is configured to detect a displacement of an optical image, which is formed on a light receiving surface thereof by the light beam which is emitted from the light source and passes through the optical scale, the detection unit outputting a current signal component as the output signal, and
the signal elimination unit subtracts one of an entirety of a DC current signal component, which is free from dependency on a relative displacement between the light source and the optical scale, and a current signal component that is proportional to the DC current signal component, the entirety of the DC current signal component and the current signal component proportional to the DC current signal component being included in the current signal component that is output from the at least one light receiving element;

the encoder further comprising a current/voltage converter unit configured to convert to a voltage signal a current signal that is obtained after one of the entirety of the DC current signal component and the current signal component that is proportional to the DC current signal component is eliminated by the elimination unit from the current signal component that is output from the detection unit.

12. The encoder according to claim 11, wherein teat least one detection unit and the signal elimination unit are mounted on one of the a board and a same semiconductor substrate.

13. The encoder according to claim 11, further comprising a differential amplifier unit configured to execute subtraction and amplification for voltage signals with opposite phases of the optical image, which are included in voltage signals which are converted by the current/voltage converter unit, thereby effecting conversion to one of a cyclic encoder signal and a substantially sinewave encoder signal.

14. The encoder according to claim 13, wherein the at least one detection unit and the signal elimination unit are mounted on one of the a board and a same semiconductor substrate.

15. The encoder according to claim 11, wherein at least two of the detection unit, the signal elimination unit and the current/voltage conversion unit are mounted on one of a board and a same semiconductor substrate.

16. The encoder according to claim 11, wherein at least two of the detection unit, the signal elimination unit, the current/voltage conversion unit and the differential amplifier unit are mounted on one of a same board and a same semiconductor substrate.

17. An encoder comprising:
an encoder scale having a predetermined cyclic pattern;
at least one detection means for detecting a cyclic displacement according to movement of the encoder scale, the at least one detection means outputting an output signal which includes an AC signal component depending on a relative displacement of the encoder scale and a DC signal component not depending on the relative displacement of the encoder; and
signal elimination means for performing an arithmetic operation for subtracting, from an output signal of the at least one detection means, one of an entirety of the DC signal component and a signal component that is proportional to the DC signal component,
wherein the at least one detection means and the signal elimination means are mounted on one of a single board and a single substrate.

* * * * *